Feb. 23, 1971   R. D. LEYDEN ET AL   3,566,348
RANGE MEASURING SYSTEM
Filed May 16, 1969                              2 Sheets-Sheet 1

INVENTORS.
ROBERT D. LEYDEN
DONALD L. KNIPPEL
BY
Nienow & Frater
ATTORNEYS.

United States Patent Office 3,566,348
Patented Feb. 23, 1971

3,566,348
RANGE MEASURING SYSTEM
Robert D. Leyden, Costa Mesa, and Donald L. Knippel, Huntington Beach, Calif., assignors to Babcock Electronics Corporation, Costa Mesa, Calif., a corporation of Delaware
Filed May 16, 1969, Ser. No. 825,232
Int. Cl. G01s 11/00
U.S. Cl. 340—16                                              5 Claims

ABSTRACT OF THE DISCLOSURE

This invention relates to a range measuring system of the kind in which range is found by a computation based upon the difference in time of arrival at a measuring position of two signals initiated as an incident to occurrence of a distant event, the propagation velocities of which are different and are known. The embodiment illustrated and described senses infrared radiation and acoustic pressure waves which serve as signatures of the same event, measures the time difference of their arrival at the measuring point, and transforms that time information into distance information. The system also incorporates structures for indicating the direction in which the event occurred.

---

Figure 1:
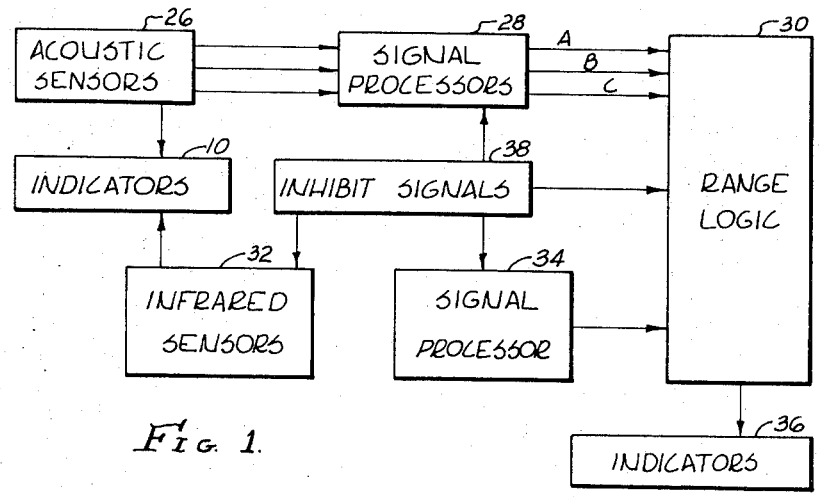

This invention relates to improvements in range measuring systems. It relates particularly to range measuring systems in which range is computed on the basis of the time difference between arrival at the measuring position of two energy forms of known propagation velocity as an incident to occurrence of an event the distance to whose place of occurrence is to be measured.

An object of the present invention is to provide an improved range measuring system of this kind. Such a system has the advantage that it need not employ energy transmission equipment and it need not itself emit energy. In this connection, it is an object of the invention to provide a range detection system which is itself relatively secure from detection and which is relatively inexpensive to produce and to operate.

Examples of events which result in the simultaneous release of energy in different forms and which can traverse a distance and be detected at a measuring position include explosions which result in sonic waves propagated through the air and in pressure waves which are propagated through the earth. Motor vehicle startup also can result in air and earth propagated pressure waves. Many events result in simultaneous release of mechanical pressure waves and electromagnetic radiations such, for example, as the simultaneous emission of an acoustic wave and a visible radiation. Detonations or explosions may result in the simultaneous emission of an acoustic wave and infrared radiations.

Although the invention has wider application, it is this particular combination of energy forms which is used in measuring range in the embodiment now considered to be the best mode of practicing the invention and which has been selected for illustration in the drawings and detailed description herein. Accordingly, one of the objects of the invention is to provide an improved range measuring system for determining the distance from a measuring position to the place of an event identified by the simultaneous release of electromagnetic rays and an acoustic pressure wave. The embodiment shown is useful for detecting the range and direction of major explosions, and an object is to provide an improved explosion sensor capable of distinguishing between major and minor explosions. One particular object of the invention is to provide an apparatus which can measure the range to the occurrence of explosions of hand-grenades but which will be insensitive to small arms fire.

These and other objects of the invention are realized in part by the provision of a system sensitive to two energy forms having known, different propagation velocity and which comprises: timing means for measuring times; energy sensing means for sensing arrival of the energy forms at the measuring point; means responsive to the first to arrive of said energy forms to initiate the timing means; means responsive to the second to arrive of the energy forms to stop the timing means; and an indicating means sensitive to the time interval between initiation and stopping of the timing means for indicating distance to the place of the event.

Figure 3:
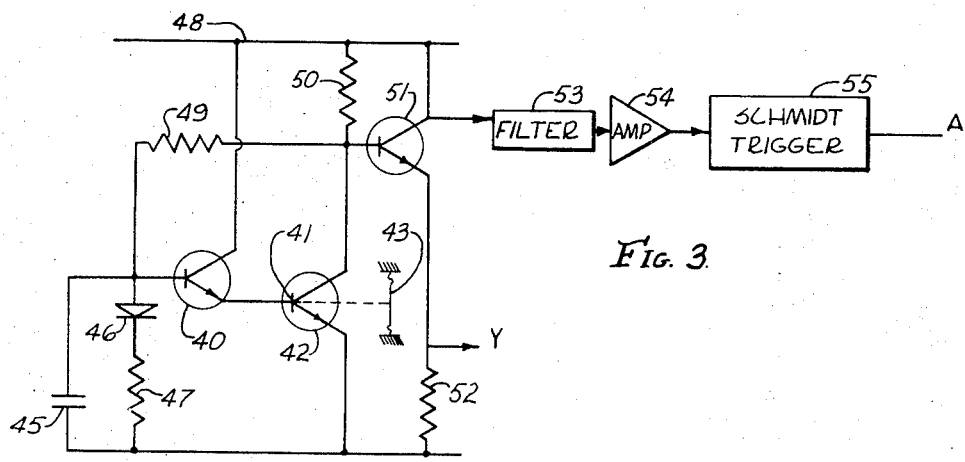
Figure 2:
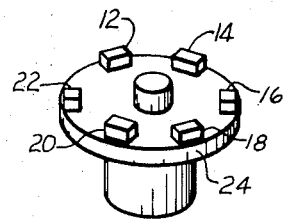
Figure 4:
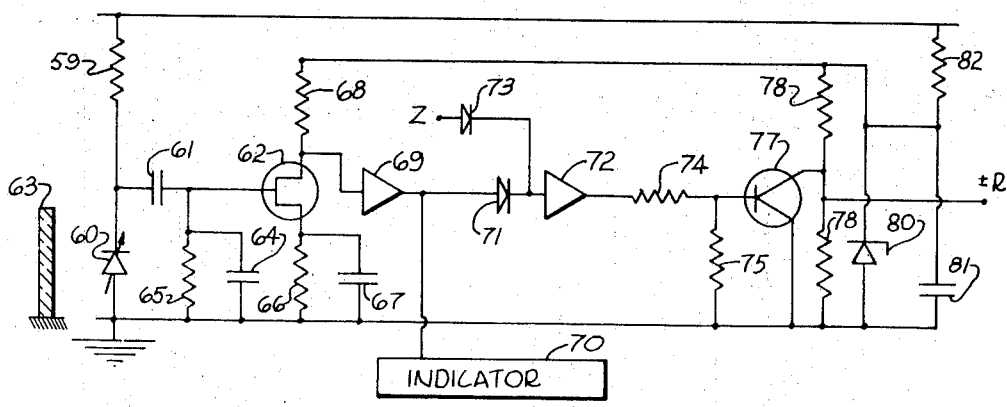
Figure 5:
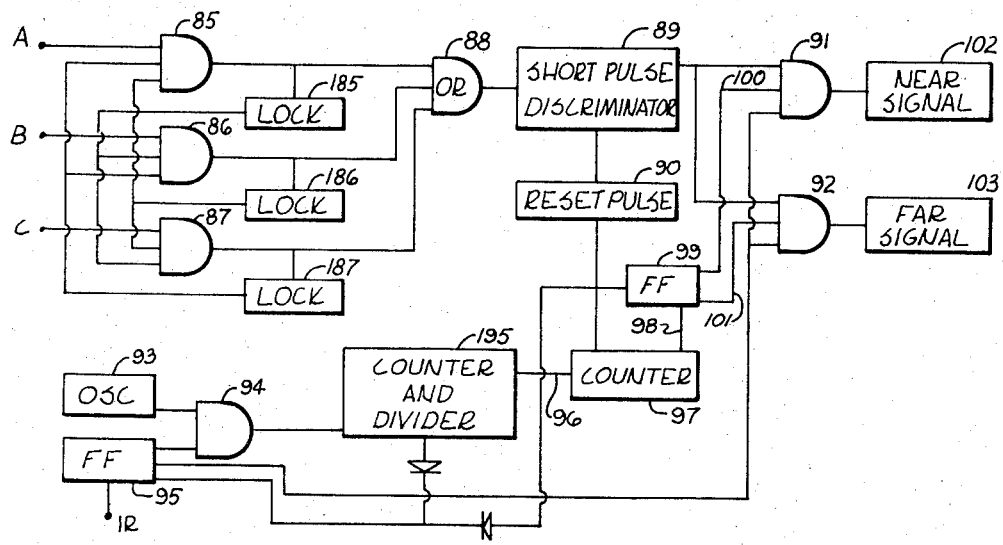

In the drawings:
FIG. 1 is a schematic diagram of a range measuring system embodying the invention;
FIG. 2 is an isometric view of a range measuring assembly incorporating the system of FIG. 1;
FIG. 3 is a schematic diagram of one of the acoustic sensors employed in the system;
FIG. 4 is a schematic diagram of one of the infrared sensors employed in the system together with part of a signal processor of infrared sensor outputs; and
FIG. 5 is a schematic drawing of the range logic portion of the system of FIG. 1.

Means are provided in the invention for sensing arrival of energy forms released as an incident to a distant event. At least two different energy forms are required and their propagation velocity must be known. The energy forms need not differ in kind so long as they have different propagation velocity and the velocities are known.

The energy sensing means is a means capable of sensing the time of arrival of two quantities of energy which were released simultaneously in the sense that the two forms of energy begin traveling toward the measuring position at the same instant or in the sense that energy in one form begins traveling toward the measuring position simultaneously with the initiation of a chain of events resulting, after a known time interval, in transmission of the second form of energy towards the measuring position.

The invention includes a timing means and means responsive to the first to arrive of the energy forms to initiate the timing means and means responsive to the second to arrive of the energy forms to stop the timing means. These structures may be of a type which marks time only during a period between the arrival of two energy forms or it may have the form of a clock that operates continually combined with structures to record the difference in time between the arrival of the first and second energy forms. Further, the invention comprises an indicating means sensitive to the time interval between initiation and stopping of the timing means for converting that time information to distance. This structure may have several forms, an elemental one of which would include counting time in units so readily convertible to units of distance that indication of the time is itself equivalent to an indication of distance whereby the same structure may serve as a timing and an indicating means.

Referring to FIG. 1 of the drawings, the system there shown includes two sets of indicators. One set of those indicators is represented by a block labeled INDICATORS. It is designated by the reference numeral 10. It receives inputs from the acoustic sensors and from the infrared sensors. This system, for which FIG. 1 is a schematic diagram, employs six infrared sensors and three acoustic sensors. These sensors are contained in six sensor housings 12, 14, 16, 18, 20 and 22 which are equally spaced around the perimeter of a circular platform 24. Each of the sensor housings contains an infrared sensor. Alternate housings also contain an acoustic sensor. The acoustic sensors are contained in housings 12, 16 and 20. The platform 24 is several feet across. A few feet is ample to enable a determination of which one of the acoustic sensors was first subjected to an acoustic shock wave. Thus, it is possible to get an approximate indication of the direction from the platform of the event which resulted in emanation of that wave. An electromagnetic sensor is easily made direction sensitive by shielding. It is possible but it is more difficult, to make an acoustic sensor direction sensitive. One way to determine the direction of the event is to use spaced sound sensors as is done here. However, the direction of the event is much more easily determined by using sensors of electromagnetic radiation, here infrared sensors, which are confined to relatively narrow "look angles" by being shielded against all but radiations from a selected sector, whereby an event in any direction will be seen by only one sensor or by two adjacent sensors depending upon its direction and range.

In FIG. 1, the three acoustic sensors are represented by the block 26 labeled ACOUSTIC SENSORS having three outputs, one for each sensor, to a respectively associated signal processor. These processors are represented by the block 28 labeled SIGNAL PROCESSORS. In this embodiment, each acoustic sensor has its own signal processor so that there are three output lines, labeled A, B and C, respectively, connected from the signal processors 28 to the range logic circuitry 30.

The six infrared sensors are represented in FIG. 1 by the block 32 and labeled INFRARED SENSORS. In this embodiment each sensor has its own output and the six sensor outputs are shown connected to a common signal processor 34 labeled SIGNAL PROCESSOR. The output line of that processor is labeled IR and it supplies an input to the range logic system 30. The output of the range logic portion of the system is supplied to indicators 36 which indicate range. Block 30 is labeled RANGE LOGIC and block 36 is labeled INDICATORS.

In practical applications of the system, there may be ambient signal energy levels that could provide false readings, multiple energy radiating events and other opportunities for anomalous signals. To foreclose these signals from having an adverse effect upon the system, and particularly of resulting in false indications, provision is made for the generation of inhibiting signals which are applied to the sensors or to the signal processors or even to the range logic. The structure for generating such signals is generated by the INHIBIT SIGNALS block 38 in FIG. 1 which is shown connected to the infrared sensors to the signal processors and to the range logic portion of the system.

FIG. 3 is a diagram of a preferred form of acoustic sensor and acoustic signal processor. All three sensors and processors may be the same and in this embodiment they are the same. The sensor and processor shown provides the output signal A. In this diagram the two transistors 40 and 42 comprise a direct coupled feedback amplifier. The transistor 42 is an NPN silicon planar device which has its emitter base junction mechanically coupled to a diaphgram exposed and sensitive to acoustic shock waves. This circuit is traced from the emitter of transistor 40 to the base of transistor 42 and from the emitter of transistor 42 to supply line 44 and from that supply line to the base of transistor 40 through the parallel combination of a capacitor 45 in one branch and the series combination of a diode 46 and an input resistor 47 in the other leg. The collector of transistor 40 is connected to the other supply line 48. The collector of transistor 42 is connected through a resistor 49 to the base of transistor 40 and through a resistor 50 to the supply line 48. The collector of transistor 42 is the output point of the direct coupled amplifier sensor and is connected to the base of a transistor 51 whose emitter is connected by a resistor 52 to line 44 and whose collector is connected to the supply line 48 and to the input of a low pass filter 53. The transistor 51 and resistor 52 comprise an emitter-follower. An output line Y at the emitter of transistor 51 indicates that an output may be taken from the sensor to an indicator, such as indicators 10 of FIG. 1, if desired. This sensor circuit may ring. To insure that the input to the following stages of the signal processor is a pulse whose amplitude and width are representative of the amplitude and duration of the shock wave, the filter 53 is inserted in the line to remove high frequency components of the sensor output. In this embodiment the filter 53 is a low pass device which cuts off signal components above 30 kHz.

After filtering, the sensor output is amplified in an amplifier 54 and the pulse is then squared in Schmitt trigger 55. The Schmitt trigger is arranged so that it turns on during the positive half of an input pressure wave at some given amplitude which can be predetermined or which is controlled by an inhibit signal of variable amplitude. Advantageously, the Schmitt trigger is set to turn off at an input amplitude near zero. This arrangement insures that the output at A is a squared pulse whose duration matches the duration, above ambient amplitude, of the shock wave emanating from the event to be sensed.

In most applications more conventional types of acoustic signal pickup devices are satisfactory. The circuit of FIG. 3 ahead of amplifier 54 is replaced by a crystal or dynamic microphone and a preamplifier.

FIG. 4 is a schematic drawing of an infrared sensor and an infrared signal processor. The reference numeral 60 designates a photoconductive diode which is back biased through a resistance load 59. Voltage variation across the diode is coupled through a capacitor 61 to the emitter of a field effect transistor 62. Visible and ultraviolet radiations are filtered optically in a filter 63 which shields the photoconductive diode 60. Upon being subjected to a flash of infrared radiation, the diode 60 is rendered conductive so that the voltage appearing across the coupling capacitor 61 rises sharply to a spike and then falls away exponentially, rapid at first, then ever more gradually. The low frequency components are prevented from appearing in the output of the field effect transistor stage by a high frequency bypass circuit connected between the emitter of transistor 62 and ground and comprising the parallel combination of capacitor 64 and resistor 65. Some low frequency suppression is provided by degeneration in the base one circuit afforded by the combination of resistor 66 and capacitor 67. Output is taken at the base two side of load resistor 68 and is applied to amplifier 69 whose purpose is to serve as an impedance changing device. In addition means may be, and are, included in the amplifier to reject, on the basis of their wave shape, optical signals which result from interrogation of ambient light falling on the sensor by shadows or acoustic shock waves. Amplifier output is directed to an indicator 70 and through the terminal XX and an isolating diode 71 to an amplifier 72. Amplifier 72 is the first element in the signal processor 34. The outputs of other IR sensors are applied to the amplifier 72 through isolating diodes, only one of which is shown but which is intended to represent corresponding circuit in all of the IR sensors. The one diode shown is designated by the reference numeral 73 which has connection to an input terminal Z. The terminals XX in this circuit have been provided so that an inhibit function can be provided at this point to prevent the transmission of a sensor output signal originating after initiation of an output pulse in another IR sensor whereby to eliminate anomalous signals. A structure which will provide this function is illustrated in FIG. 5 where it is employed in connection with the acoustic sensor signals. In this embodiment the terminal XX are simply connected together and no inhibiting signal is introduced at this point.

The output of amplifier 72 is applied to a voltage divider consisting of the combination of resistors 74 and 75 and which extends to the ground line 76. The base of an amplifier transistor 77 is connected to the junction between those two resistors. Its emitter is connected to the ground line and its collector is connected to the junction between resistors 78 and 79 which extend across the supply lines. Output from this stage is taken at the collector of transistor 77 and appears at the terminal labeled IR. The parallel combination of a Zener diode 80 and a capacitor 81, which are connected in series with a resistor 82 across the supply lines, biases the transistor 77 operation so that only input signals over a predetermined amplitude will be amplified. Accordingly, the noise appearing at terminal IR is reduced and instead only a pulse indicative of the duration of infrared radiation from the event whose range is being found appears at that terminal.

The range logic and range indicator portions of the system are illustrated in FIG. 5. The reference numerals 85, 86, and 87 designate gates associated with the acoustic sensors and signal processors which provide output signals A, B, and C, respectively. Gate 85 will pass a pulse at input line A provided that no signal has previously been applied to the gate from the acoustic sensors and signal processors which provide output signals B and C. Thus, the gate 85 opens upon receiving an input of A and not B and not C. Similarly, gate 86 will pass the input signal B if a signal has not previously been applied to inputs A or C and gate 87 will pass a signal applied at line C provided that a signal has not previously been applied to lines A or B. This is accomplished by the use of lock-out circuits, one for each of gates 85, 86 and 87 and identified by the reference numerals 185, 186, and 187, respectively, and the label LOCK. The first lock to receive a signal from its gate, supplies lock-out signals to the other two gates.

The outputs of these three gates are applied as inputs to the OR gate 88. The output of the OR gate is applied to a flip-flop circuit 89, or the equivalent of a flip-flop, which is represented by a block in FIG. 5 bearing the legend SHORT PULSE DISCRIMINATOR. The flip-flop has an internal timing circuit which prevents passage of a pulse from the OR gate 88 unless that pulse has longer than a selected duration. That selected duration is short relative to the transient time of acoustic signals over the shortest distance to be measured. In this embodiment the short pulse discriminator is effective to prevent a reaction to a signal output from the OR gate 88 unless that signal endures longer than 280 microseconds in which time an acoustic wave travels less than a half a meter at ordinary temperatures. If the pulse output from OR gate 88 endures longer than 280 microseconds, the short pulse discriminator 89 permits it to pass and to be applied to a reset pulse generator 90 to a gate 91 and to another gate 92. The reset pulse generator 90 generates a pulse at the beginning of the acoustic signal pulse and applies it to stop the clock or timing means which also forms a part of the range logic portion of the system.

The timing structure in this embodiment includes an oscillator 93 which provides an alternating output signal at the frequency 256 kHz. Output of the oscillator is applied as one input to the AND gate 94. The other input signal to the gate 94 is taken from a flip-flop 95. In one state the flip-flop output opens gate 94 to permit passage of oscillator signals to the COUNTER AND DIVIDER structure 95. Flip-flop output is also applied at the two gates 91 and 92.

The flip-flop 95 ordinarily has a state to preclude passage of oscillator signals through the gate 94. Upon receipt of a pulse at its IR input terminal the state of the flip-flop 95 changes to permit signals from oscillator 93 to pass through the gate 94 to the counter 95. Block 95 represents a shift register and divider combination. In this embodiment it is a ten cell shift register and provision is made for division by 720, 752 and by 776. In this embodiment the divider is selected manually in view of the air temperature and through the acoustic wave is promulgated. Other divisors could be selected. These three divisors result in the provision of output pulses at line 96 at intervals of 2.81, 2.94 or 3.03 milliseconds. These periods correspond to the velocity of sound through a distance of one meter at air temperatures of 96°, 61° and 30° F., respectively. These pulses are applied to a five cell counter represented by COUNTER block 97 and in this particular embodiment outputs are taken from counter 97 at line 98 at time intervals corresponding to four meters of sound travel in air. They are applied to a flip-flop which has two outputs, one representing receipt of a signal at line 98 corresponding to a distance less than a selected distance, and the other output of the flip-flop 99 corresponding to receipt of a time signal indicating that the distance is greater than that amount to the place of the event. The nearest signal output line from flip-flop 99 is designated 100 and the far signal output line is designated 101. Line 100 is applied to gate 91 whose output actuates a near signal indicator represented by NEAR SIGNAL block 102. The output line 101 is applied to gate 92 and when so applied, and provided that signals are also provided from the short pulse discriminator and from the flip-flop 95, the gate 92 applies a signal to the far signal indicator represented by FAR SIGNAL block 103. The function of the reset pulse generator, identified as RESET PULSE block 90, is to generate a pulse indicating the receipt of an acoustic signal which is applied to turn off the counter 97 and mark the end of the time period between receipt of the IR signal and receipt of the acoustic signal. It is also applied to reset the flip-flop 95. If no reset pulse is received by the flip-flop 95 from the reset pulse genrator 90, it will nonetheless be reset by a reset pulse generated in counter and divider 95 when that counter is filled.

It should be noted that the system can be made sensitive to small arms fire and insensitive to greater explosions, or implosions, by simply inverting the function of the short pulse discriminator 89. Also, it is important that the system can be made to compensate for the greater propagation velocity of certain kinds of shock waves by altering the apparent time of beginning of a time measurement. This is accomplished by starting shift register counting at a circuit point other than zero.

Although I have shown and described certain specific embodiments of my invention, I am fully aware that many modifications thereof are possible. Our invention, therefore, is not to be restricted except insofar as is necessitated by the prior art and by the spirit of the appended claims.

What we claim is:

1. A range measuring system for measuring distance from a measuring position to the place of an event identified by the simultaneous release of amounts above ambient level of at least two energy forms having known, different propagation velocities, comprising:
   timing means for measuring time;
   energy sensing means for sensing arrival of said energy forms at the measuring point;
   means responsive to the first to arrive of said energy forms to initiate said timing means;
   means responsive to the second to arrive of said energy forms to stop the timing means;
   indicating means sensitive to the time interval between initiation and stopping of the timing means for indicating distance to the place of the event;
   energy sensing means comprising means for sensing arrival of electromagnetic energy and of a mechanical pressure wave; and
   in which said energy sensing means comprises a plurality of spaced acoustic sensors and in which said means responsive to the second to arrive of said energy forms comprises means for sensing simultaneously the output of said plurality of sensors and is operative to stop the timing means only when the output of one sensor exceeds the output of the remainder in predetermined degree.

2. A range measuring system for measuring distance from a measuring position to the place of an event identified by the simultaneous release of amounts above ambient level of at least two energy forms having known, different propagation velocities, comprising:

timing means for measuring time;

energy sensing means for sensing arrival of said energy forms at the measuring point;

means responsive to the first to arrive of said energy forms to initiate said timing means;

means responsive to the second to arrive of said energy forms to stop the timing means;

indicating means sensitive to the time interval between initiation and stopping of the timing means for indicating distance to the place of the event;

energy sensing means comprising meas for sensing arrival of electromagnetic energy and of a mechanical pressure wave;

in which said energy sensing means comprises an acoustic energy sensor and in which said means responsive to said second to arrive of said energy forms comprises means effective to stop said timing means only upon receipt of signals from said acoustic sensor indicating arrival thereat of acoustic energy having not less than preselected magnitude continuously for not less than a preselected period;

in which said energy sensing means further comprises an electromagnetic sensor sensitive to infrared radiation and relatively insensitive to visible radiations;

in which said energy sensing means comprises a plurality of infrared radiation sensors each sensitive to radiations arriving at said measuring position from a different sector of directions and means sensitive to output signals from said infrared sensors for indentifying the sector from which infrared radiations are received; and in which said acoustic energy sensor comprises a plurality of spaced acoustic sensors, and in which said means responsive to the second to arrive of said energy forms comprises means of sensing simultaneouly the output of said plurality of acoustic sensors and is operative to stop said timing means when the output of one sensor exceeds the output of the remainder in predetermined degree, and which further comprises means for determining which sensor is operative to stop the timing means.

3. A range detector of explosions which initiate infrared radiation and acoustic pressure waves, comprising in combination;

a clock of the type which provides periodic electrical clock signals marking uniform time intervals;

infrared radiation sensing means for providing a count initiating signal as an incident to interception of infrared radiation;

acoustic wave sensing means for providing a count terminating signal as an incident to interception of an acoustic shock wave;

counting means sensitive to said count initiating and count terminating signals for counting the number of clock signals occurring between them; and in which said acoustic wave sensing means comprises a plurality of acoustic sensors spaced apart at a sensing position, each being effective to provide a signal whose duration corresponds to the duration of acoustic shock waves, and a like plurality of gates effective to pass output signals from respectively associated ones of said acoustic sensors in the absence of output signals from others of said acoustic sensors, and means sensitive to passage of a signal through one of said gates for providing a count terminating signal in the event that said output signal has longer than preselected duration.

4. The inventon defined in claim 3, in which said clock comprises an electronic oscillator and a counter of oscillations and means for altering the number of oscillations counted in a unit of time to correct for variations in acoustic wave propagation velocity.

5. The invention defined in claim 4, which further comprises an indicator responsive to the number of oscillations counted to indicate whether that number exceeds or is less than a predetermined number.

References Cited

UNITED STATES PATENTS

| 684,706 | 10/1901 | Mundy | 340—16 |
|---|---|---|---|
| 1,194,376 | 8/1916 | Furber, Jr. | 340—16 |
| 1,225,796 | 5/1917 | Fricke | 340—16 |
| 2,398,432 | 4/1946 | Livermore | 340—16X |
| 2,823,974 | 2/1958 | Daniels | 340—16X |
| 3,307,143 | 2/1967 | Wyse et al. | 340—3 |

RICHARD A. FARLEY, Primary Examiner

U.S. Cl. X.R.

343—112